United States Patent [19]

Burch

[11] Patent Number: 4,822,425

[45] Date of Patent: Apr. 18, 1989

[54] AGGREGATE STABILIZATION

[76] Inventor: Richard M. Burch, 11908 Berwick La., Knoxville, Tenn. 37922

[21] Appl. No.: 27,646

[22] Filed: Mar. 19, 1987

[51] Int. Cl.$^4$ .................................................. C08L 95/00
[52] U.S. Cl. ................................ 106/273.1; 106/225; 106/284
[58] Field of Search .................. 106/225, 273 R, 277, 106/281, 284; 252/311.5

[56] References Cited

U.S. PATENT DOCUMENTS

| | | | |
|---|---|---|---|
| 20,702 | 9/1906 | Villard | 106/225 |
| 95,378 | 9/1869 | Ranney | 106/225 |
| 311,401 | 1/1885 | Wilber | 106/225 |
| 385,057 | 6/1888 | Jones | 106/225 |
| 549,133 | 11/1895 | Jennens | 106/225 |
| 752,486 | 2/1904 | Van Westrum | 427/138 |
| 781,079 | 1/1905 | Loebell | 427/136 |
| 800,282 | 8/1858 | Leehber | 106/225 |
| 1,565,125 | 12/1925 | Van Westrum | 106/225 |
| 1,612,677 | 12/1926 | Vivas ety al. | 106/225 |
| 1,995,598 | 3/1935 | Archibald | 404/76 |
| 2,238,776 | 4/1941 | Kleinicke | 44/6 |
| 2,377,639 | 8/1942 | Miller | 106/241 |
| 3,399,608 | 9/1968 | Benson | 404/76 |
| 3,645,947 | 2/1972 | Quigg | 524/60 |
| 4,412,864 | 1/1983 | Kurashige et al. | 106/281 |
| 4,437,896 | 3/1984 | Partanen | 106/281 |
| 4,465,518 | 8/1984 | Miyoshi | 106/89 |
| 4,492,781 | 1/1985 | Duszak et al. | 524/59 |

*Primary Examiner*—Paul Lieberman
*Assistant Examiner*—Willie J. Thompson
*Attorney, Agent, or Firm*—Ronald L. Lyons

[57] ABSTRACT

The invention relates to an aggregate stabilizing emulsion comprising pitch, rosin, an emulsifying agent and water. The invention further relates to a method of stabilizing aggregate including a material produced from the aggregate which is pliable, weight supporting, freeze resistant, water impermeable and repairable and useful for paving, patching or sealing roadways, driveways and the like.

22 Claims, No Drawings

AGGREGATE STABILIZATION

BACKGROUND OF THE INVENTION

This invention relates to an emulsion which may be used when mixed with aggregate for stabilizing the aggregate to produce a product which may include a material for paving, patching or sealing roadways. However, the invention may be used for any purpose where the stabilization of aggregate is necessary, such as building blocks and the like.

Over the years attempts have been made to control the formation of dust on gravel or soil roadways. The processes used for dust control resulted in the use of certain tackifiers and other petroleum based materials. These materials tend to agglomerate the dust particles. Small particles of dust and soil would be formed for a short period of time and this resulted in the control of dust. It was found that when the ambient temperature was relatively cold, below 40° F. to 50° F., this material tended to control dust better than when the ambient temperature was relatively warm, above 90° F., such as during the summer months. During the summer months when ambient temperatures were above 90° F. these dust control agents would adhere to automobile or truck tires resulting in the surface of the roadway being severely damaged. Further, the tires of these vehicles would sink into this soft dust control material whether the ambient temperature was cold or hot. This material was merely a temporary means of controlling dust by covering roadways with a tackifier. Several years later asphalt technology was developed and these gravel and soil roadways were paved with asphalt. Asphalt has characteristics such as weight supporting, repairable, freeze resistant, flexible and impermeable to water. However, due to the expense of paving roadways with asphalt, other alternatives other than asphalt, have been investigated. These alternatives would allow less traveled roadways to contain surfaces similar to asphalt at a reduced cost as compared to asphalt. Many unsuccessful attempts have been made to duplicate asphalt's characteristics with more inexpensive materials.

The instant invention has succeeded in not only duplicating many of the characteristics of asphalt but surprisingly exceeding many of these characteristics with a more economical product. The instant invention provides a novel emulsion, a novel process of stabilizing aggregate for use preferably on roadways and a novel material which may preferably be used as a roadway paving material.

The novel emulsion of the instant invention produces a material which comprises a stabilized aggregate which is bound together sufficiently to withstand stress and pressures associated with heavy vehicles traveling on roadways.

The product of the invention preferably is a paving material used for paving the surfaces of roadways. The product is pliable and consequently will not "break-up" under the maximum allowable highway axle weights of vehicles traveling on these roadways paved with the instant material. The surface of the instant materials are waterproof and actually shed water. These surfaces are actually hard enough so that upon rapid acceleration by automobiles, the tires of these automobiles will not disrupt the surface but will actually leave skid marks on the surface. Furthermore, the instant material is resistant to freeze cycles.

The concentrated emulsion of the instant invention has an excellent shelf life of at least 6 months, may be diluted with water up to 1 part concentrated emulsion to 30 parts water, is environmentally safe, is non-flammable and non-corrosive and may be diluted with hard water over a broad pH range.

U.S. Pat. No. 752,486 issued to Leonard Schade Van Westrum Feb. 16, 1904, discloses a method of forming and maintaining roads, etc. This patent further discloses a means for binding road material together to prevent the disintegration of the road material and the production of dust or dirt. More specifically, '486 teaches dissolving an oily substance in water and sprinkling this oily substance on the roadway. The oils disclosed in '486 are soluable in water, see column 2 lines 72–73 and lines 86–87. The instant mixture of pitch and rosin is not soluble in water. Further, '486 does not use materials, such as, crude oil and tar, see, for example, column 1 line 32. The oils as disclosed in '486, as mentioned, are soluble in water and when applied to a roadway would be solublized by rain water. The material would dissolve and be washed away.

U.S. Pat. No. 2,377,639 to Abraham B. Miller, filed Aug. 10, 1943, discloses a soil stabilization material which comprises a mixture of saponified, substantially petroleum-hydrocarbon insoluable pine wood resin. This material is used to treat soil and especially road soils for use as road building materials. '639 further teaches that some road soils have poor load bearing qualities and the invention disclosed in '639 improves this quality. The composition of the invention as taught in '639 does not contain rosin, see, for example, column 2 lines 11–17. '639 teaches that the pine wood comprises the resinous residue remaining after separation of the rosin from the total resinous extract of the wood. Further, for example, see column 2 line 25–31, where it is stated that extraction of this mixture with a petroleum hydrocarbon dissolves and removes the rosin. In the instant invention, rosin is a critical ingredient along with pitch forming the pine tar mixture for use in the instant emulsion.

U.S. Pat. No. 781,079 to Freidirch Wilhelm Alexander Leobell, issued Jan. 31, 1905, discloses a method of forming or treating roadways by moistening and impregnating the roadways with lyes, resinous ingredients and salts contained in the lyes. The materials used in '079 appears to be calcium lignosulfinate, a waste material from the paper industry. This material is water soluable and has been used for years as a dust control agent on roadways. It is effective as a dust control agent until washed away by rainwater. This material could not be used as a permanent aggregate stabilizing material to produce a stable aggregate as in the instant invention.

U.S. Pat. No. 2,238,776 to Werner E. Kleinicke, issued Apr. 15, 1941, teaches a composition and method for controlling coal dust and for use in soil stabilization in connection with the construction of roadways. This material is a colloid which forms a jel with water. The material is a hydroscopic material which will absorb and retain water vapor from the surrounding air. This type of material will literally absorb water and in some instances be dissolved in water. The material as disclosed in '776 is a dust control agent and absorbs moisture from the air in order to remain moist inorder to control dust. The disadvantage of this characteristic is the fact that after heavy rains the roadways become very muddy or the material is merely dissolved and washed away. This material would be a destabilizing agent as to the instant invention. Further, the composition contains a water soluable crystalizable salt which may be calcium chloride and may further contain an oil, for example, pine oil. Pine oil is separated out in the distillation process in the paper industry at a lower distilation temperature than pitch. Pitch is normally the residue obtained from the distillation process in the paper industry. It is generally refered to as tall oil pitch. Tall oil being a by-product of the alkaline pine wood-pulping process comprised of about equal parts of rosin acids and fatty acids. Further, the oil in '776 may be any suitable mineral, vegetable or animal oil including as mentioned, pine oil or it may include common rosin along with many other suggested synthetic or natural resins. Further, it is taught that the resin is desirable but in no sense essential. Further, '776 teaches, page 3 column 1 lines 22-31, that a major part of the water evaporates from the composition but the crystalizable salt attracts moisture from the atmosphere and maintains the surface of, for example coal or soil, moist. Further, the crystalizable salts as mentioned in page 1 column 1 lines 45-50 are corrosive materials.

U.S. Pat. No. 3,645,947 to Donald J. Quigg, et al., issued Feb. 29, 1972, discloses a rubber emulsion comprising a lactone terpolymer, solvent, emulsifying agent and water and optionaly asphalt and other additives such as tackifiers and extender oils. This material is used to stabilize loose soil formations such as highway surfaces, etc.

U.S. Pat. No. 4,465,518 to Hajime Miyoshi, et al, issued Aug. 14, 1984, discloses a composition for improving the strength of a soft soil composition by treating this material with sulfuric acid and a portland cement.

U.S. Pat. No. 3,399,608 to J. R. Benson, issued Sept. 3, 1968, discloses blending an emulsified asphalt with soil material to provide a stabilized soil structure.

U.S. Pat. No. 1,995,598 to F. M. Archibald, issued Mar. 26, 1935, discloses a method of manufacture of a suitable solution for spraying on to dust laden air or deposited dirt in coal mines, grain elevators, or on roadways. The material comprises a water solution of alkali sulphonate derived from mineral oils and a hydroscopic material. The alkali material may be alkaline earth metals, ammonia or equivalent basic non-metallic compounds. The hydroscopic material may be glycerine or calcium chloride. This material would attract water in the final product after application resulting in the surface of the roadway or coal material remaining moist and in some cases after heavy rain this material would be dissolved and washed away. Further, plasticing materials may be used such as glue, glucose, emulsified asphalt, asphaltic oil, etc. This material may be used with or without the hydroscopic material. The addition of this material, as stated in '598 tends to make the cemented dust controlable. This is a common dust control method i.e., spraying a solution of sodium sulphonate on a dirt road in quantities sufficient to wet the surface and thereby prevent dust from forming for limited periods of time.

Although the above patents rely on different mechanisms to either control dust or form a particle asphalt type soil or aggregate stabilizing composition or generally teach compositions of matter that may be used for the construction of roadways, each suffer from the same common deficiencies, in that, the instant invention utilizes critical amounts of pitch and rosin to form a "pine tar mixture" which is utilized in the instant emulsion. The instant emulsion contains critical maximum emulsified particle sizes of pitch and rosin dispersed therein in order to form a final product which is a stable, weight bearing, flexible, water impermeable, freeze resistant aggregate stabilized material.

In view of the state-of-the-art, it can readily be seen that there is a need for an economical aggregate stabilizing material which has characteristics similar to asphalt but which is much more economical to use. The need has been met since the materials and application of the instant invention are much less expensive and the final product is equivalent to the properties of asphalt.

OBJECTS OF THE INVENTION

It is, therefore, an object of this invention to provide a novel "pine tar mixture" comprising pitch and rosin for stabilizing aggregate.

It is a further object of this invention to provide a novel and improved emulsion system for effecting the stabilization of aggregate.

It is a further object of this invention to provide a novel emulsion comprising a "pine tar mixture" comprising pitch and rosin and an emulsifying agent and water.

It is a further object in this invention to provide an emulsion for stabilizing aggregate which may be further diluted with water forming a composition which is easily applied to aggregate.

Another object of the invention is to provide the emulsion of the instant invention which is blended into an aggregate material thereby forming a novel structure, which initially is easily-worked, and later hardens to form a high strength material.

It is a further object of this invention to provide a process of stabilizing aggregate comprising the use of the novel emulsion of the instant invention, applying that emulsion to a critical size of the aggregate, subsequently compacting the aggregate to form a weight supporting, water impermeable, freeze resistant material from the aggregate.

Another object of the invention is to provide a process for stabilizing paving aggregate used for roadway by blending a predetermined critical amount of water into a critical size aggregate, then blending the emulsion of the instant invention with the aggregate, compressing the aggregate, thereby forming, after the water has evaporated, an unexpectedly strong paving material.

It is a further object of the invention to provide a surprising strong, stable, weight supporting, freeze resistant, water impermeable and repairable material for use, for example, in the surfacing of roadways.

The present invention comprises certain constructions. combinations and arrangements of materials and sequences, operations and steps, all of which are described in detail as follows:

SUMMARY OF THE INVENTION

The foregoing objects and others are accomplished in accordance with the present invention by providing an aggregate stabilizing mixture comprising pitch from about 5 to about 95 weight percent based on the total weight of the mixture and rosin from 1 to 70 weight percent based on the total weight of the mixture.

Further the objects are accomplished by providing a water dilutable, non-flammable, non-corrosive, aggregate stabilizing emulsion comprising (a) from about 1 to about 90 weight percent based upon the total weight of said emulsion of a mixture comprising from about 5 to 95 weight percent based upon the total weight of said mixture of a pitch dispersed in said emulsion with a maximum particle size of from about 5 to 10 microns and from about 1 to 70 weight percent based upon the total weight of said mixture of a rosin dispersed in said emulsion with a maximum particle size of from about 5 to 10 microns, (b) from about 0.1 to 5.0 weight percent based upon the total weight of said emulsion of an emulsifying agent and (c) from about 10.0 to 98.0 weight percent based upon the total weight of the emulsion of water is disclosed.

A stable, water dilutable, non-flammable, non-corrosive, dispersable, aggregate stabilizing emulsion comprising (a) from about 1 to about 90 weight percent based upon the total weight of said emulsion of a mixture comprising from about 5 to 95 weight percent based upon the total weight of said mixture of a pitch dispersed in said emulsion in a maximum particles size from about 5 to 10 microns and from about 1 to 70 weight percent based upon the total weight of said mixture of a rosin dispersed in said emulsion in a maximum particle size from about 5 to 10 microns, and (b) from about 0.1 to 5.0 weight percent based upon the total weight of said emulsion of a nonionic emulsifying agent, and (c) from about 10.0 to 98.0 weight percent based upon the total weight of the emulsion of water is disclosed.

A process is disclosed for stabilizing an aggregate comprising (a) first providing an emulsion comprising from about 1 to about 90 weight percent based upon the total weight of said emulsion of a mixture comprising from about 5 to 95 weight percent based upon the total weight of said mixture of pitch dispersed in said emulsion with a maximum particle size from about 5 to 10 microns and from about 1 to 70 weight percent based upon the total weight of said mixture of a rosin dispersed in said emulsion with a maximum particle size of from about 5 to 10 microns, from 0.1 to 5.0 weight percent based upon the total weight of said emulsion of an emulsifying agent and from about 10.0 to 98.0 weight percent based upon the total weight of said emulsion of water, (b) secondly, diluting said emulsion with from about 1 part emulsion to about 1 to 30 parts of water, (c) providing an aggregate of a size which 100 weight percent based on the total weight of the aggregate passes through a sieve size from about number 200 to about ½ inch, (d) thirdly, mixing said diluted emulsion with said aggregate sufficiently to substantially disperse all of said diluted emulsion onto substantially all of said aggregate, and (e) fourthly, compacting said aggregate with from about 50 pounds to about 50,000 pounds per square inch of compacting pressure to cause said aggregate to bond together sufficiently after said water has substantially evaporated from said diluted emulsion, forming a weight supporting, water impermeable, freeze resistant, solid material. Optionally and preferably the emulsion is sprayed onto the aggregate in its concentrated form eliminating the above described step (b). Water is added to the aggregate first and then the concentrated emulsion is added.

If there is a certain amount of moisture in the aggregate before the concentrated emulsion is added, better dispersion of the emulsion in the aggregate is obtained. This results in an unexpected increase in strength in the final product. As reflected in Table II herein, pre-wet stabilized aggregate containing 1 to 3 percent by weight based on the total weight of the aggregate, of residual "pine tar mixture" (specimens 1-6) were surprisingly stronger than stabilized aggregate, which had not been pre-wetted, and contained 4 percent residual "pine tar mixture" (specimens 7-9).

When the terms "pre-wet" or "pre-wetted" are used herein, it is meant that water has been added to the aggregate before the addition of the emulsion.

Preferred amounts of water added in the "pre-wet" step is from about 2.5 to about 3.0 percent by weight based on the total weight of the aggregate.

The preferred process of the instant invention comprises (a) first providing an emulsion comprising from about 1.0 to about 90.0 weight percent based upon the total weight of said emulsion of a mixture comprising from about 5.0 to 95.0 weight percent based upon the total weight of said mixture of pitch dispersed in said emulsion with a maximum particle size from about 5.0 to 10.0 microns and from about 1.0 to 70.0 weight percent based upon the total weight of said mixture of a rosin dispersed in said emulsion with a maximum particle size of from about 5.0 to 10.0 microns, from 0.1 to 5.0 weight percent based upon the total weight of said emulsion of an emulsifying agent and from about 10.0 to 98.0 weight percent based upon the total weight of said emulsion of water, (b) providing an aggregate of a size which 100 weight percent based on the total weight of the aggregate passes through a sieve size from about number 200 to about ½ inch, (d) thirdly, mixing said aggregate with from about 2.5 to about 3.0 weight percent of water based upon the total weight of the aggregate (e) forthly, mixing said emulsion with said pre-wet aggregate sufficiently to substantially disperse all of said emulsion onto substantially all of said pre-wet aggregate and (f) fifthly, compacting said aggregate with from about 50 pounds to about 50,000 pounds per square inch of compacting pressure to cause said aggregate to bond together sufficiently after said water has substantially evaporated from said mixture of pre-wet aggregate and emulsion, forming a strong, weight supporting, water impermeable, freeze resistant, solid material.

A material is disclosed for paving roadways, producing building blocks and the like comprising a strong, stable, weight supporting, freeze resistant, water impermeable, repairable material which comprises (a) an aggregate of a size which 100 weight percent based upon the total weight of said aggregate passes through a sieve as from about number 20 to about ½ inch, said aggregate having dispersed thereon a mixture comprising from about 5 to 95 weight percent based upon the total weight of said mixture of pitch and from 1 to 70 weight percent based upon the total weight of said mixture of rosin, (b) said aggregate coated with said mixture has been compressed with from about 50 pounds to about 50,000 pounds per square inch forming a stable, weight supporting, freeze resistant, water impermeable, repairable, solid material.

When the term "strong" is used herein it is meant that the final product, i.e. stabilized aggregate, will measure at least about 2000 pounds stability when tested using the Marshall Stability Test as illustrated in Table II herein.

When the term "water insoluble" is used herein, it is meant that the mixture of pitch and rosin when dispersed onto the aggregate material after the water has evaporated will not be washed away by rainwater and the like thereby weakening the final product. As mentioned, the oil base dust control products do not adhere or bind themselves to the aggregate but are water soluble and do wash away with the rain.

When the term "non-flammable" is used herein it is meant that the mixture or the emulsion will not catch fire instantly when exposed to a spark or flame and will not burn rapidly or continuously.

When the term "non-corrosive" is used herein it is meant that the mixture of emulsion has a neutral pH. Consequently, it will not rust or corrode metals. Many of the dust control agents of the prior art are chloride based, such as, magnesium chloride and calcium chloride which are corrosive.

When the term "mixture" or "pine tar mixture" is used herein it is meant to mean a heterogenous association of pitch and rosin. These materials are mixed together and have not chemically combined and could be separated by mechanical means. It is further meant that this mixture is a uniformly dispersed mixture of both pitch and rosin.

When the term "emulsion" or "pine tar emulsion" is used herein it is meant that the mixture of pitch and rosin has been emulsified in water using an emulsifying agent. The water being the continuous phase and the mixture of pitch and rosin being the dispersed phase. Standard emulsifying technology is used to produce the emulsion of the instant invention. Any standard emulsifying unit can be used that will produce a maximum particle size in the pitch and rosin phase of from about 5 to 10 microns with a preferred particle size of from 5 to 7 microns. An emulsifying unit may be obtained from Dalworth Machine Products which is referred to as a MT-4 Emulsion Plant.

The particles in the emulsion of both pitch and rosin have a critical maximum size of from 5 to 10 microns.

Of significance in the instant invention, is the fact that the particles of rosin and pitch formed during emulsification must be small enough so that a "coating action" on the surface of the road is not formed, but the material, i.e., emulsion, penetrates below the surface of the aggregate, coating not only the surface aggregate but the aggregate below the surface of the road. Further, the concentrated emulsion must not separate from the diluting water leaving the concentrated emulsion on the surface of the road with only the water penetrating the roadway surface. Therefore, the maximum size of the emulsified particles of pitch and rosin in the instant invention is critical. If the size of these emulsified particles are greater than the critical maximum size, the concentrated emulsion will not penetrate below the surface of the roadway or aggregate.

When the term "stabilizing" is used herein in the context of stabilizing aggregate, it is meant that when aggregate is applied to roadways and the like, the aggregate is held into place forming a solid paving material such that even through the paving material is subjected to heavy traffic such as automobiles and heavy trucks, freezing and thawing, wind and rain, erosion, etc., the material will remain unchanged.

When the term "aggregate" is used herein, it is meant to refer to materials, such as, granular rock particles, shale or similar materials with similar hardness and inertness either natural or manufactured, and either in situ or imported. When this aggregate material is blended according to the invention with the emulsion of the instant invention the stabilized aggregate results in a superior paving material for roadways having unexpected strength and unexpected flexibility which far exceeds that of comparable systems at a much reduced cost as compared to conventional asphalt.

When the term "pitch" is used herein, it is meant to refer to pine tar pitch which is the residue obtained from a "distillation column" in the paper producing process. The preferred pitch of the instant invention is available from a majority of paper manufacturers. Pitch may be obtained from Arizona Chemical Co., Wayne, N.J. 07470 under the trademark ACINTOL® P or from Union Camp Corp., Savannah, GA 131402 under the trademark of UNITOLR DP-6. Pitch is used in asphalt emulsions as a "cut-back" agent. A "cut-back" agent being a material that will lower the melting point or softening point of asphalt. Hot pitch may be used to spray on roadways to control dust. This application of hot pitch is very similar to "oiling" a road. As a dust controlling agent, the disadvantage of using a pitch is that pitch penetrates very little into the aggregate forming the roadway. This creates a very "sticky" road surface. This thin road covering of pitch is easily broken-up by the roadway traffic.

When the word "rosin" is used herein, it is meant to mean the rosin as defined in the Condensed Chemical Dictionary, 9th Edition, published by Van Nostrand Reinhold Co., 1977, page 756. The preferred rosin of the instant invention may be obtained from the Arizona Chemical Co. under the trade mark ACINTOL® R-Type S or from Union Camp Corp. under the trademark UNITOL® NCY.

Rosin is an important ingredient since the pitch by itself is more like an oil than an adhesive. It is believed that a chemical reaction occurs between the pitch and rosin mixture and the aggregate, adhering the aggregate together, thereby stabilizing it. It is known that the aggregate is generally negatively charged. In the asphalt industry, cationic asphalt emulsions are used. By using cationic and anionic emulsifiers in asphalt, it is believed that there is chemical binding via these emulsifying agents. Not only do these asphalt compositions depend upon the charges in the emulsifiers to give chemical binding with the aggregate but these emulsifying agents control the rate at which these asphalt compositions cure.

When the term "pliable" is used herein it is meant that the stabilized aggregate will not break up under the maximum allowable highway axle weights of vehicles traveling on these roadways paved with the stabilized aggregate.

When the term "water impermeable" is used herein it is meant that the stabilized aggregate is waterproof and will actually shed water.

When the term "weight supporting" is used herein it is meant that the stabilized aggregate is bound together sufficiently to withstand stress and pressures associated with heavy vehicles traveling on roadways.

When the term "repairable" is used herein, it is meant that the stabilized aggregate is easily repaired, as compared to asphalt where certain asphalt patching material tends to be easily removed from "pot holes".

When the term "stable" is used herein to describe the instant emulsion, it is meant to mean that the continuous water phase of the emulsion will not separate from the pitch/rosin phase of the emulsion for at least 6 months.

When the terms "stable" or "stabilized" are used herein to describe the instant stabilized aggregate material, it is meant that the pitch/rosin coating on the aggregate will not re-emulsify or "plate out" after compaction of the aggregate and after the water has evaporated. This stabilized aggregate material will remain stable even when exposed to large amounts of water such as heavy rains. If this material was not stable, the pitch/rosin would re-emulsify resulting in the material becoming soft and non-weight supporting.

When the term "solid material" is used herein, it is meant to describe the stabilized aggregate after it has formed a "block" of material or has formed a roadway surface, etc.

When the term "freeze resistant" is used herein, it is meant that the stabilized aggregate may be subjected to freezing and thawing temperatures without affecting the strength or weight supporting capability of the stabilized aggregate.

When the term "dilutable" is used herein, it is meant that the concentrated emulsion is capable and may be diluted with water, e.g., 1 to 30 parts water to 1 part emulsions, to form a product which is easily mixed with aggregate to provide a "pothole" or crack patching material or it may be sprayed to seal asphalt, concrete or other paved surfaces, etc.

The pitch and rosin molecules contained in the instant emulsion are polar molecules. It is believed that these polar molecules bind themselves to the negatively charged aggregate resulting in the formation of a stronger bond that a bond formed by the mechanical stickiness of the material.

When the emulsion is mixed with the aggregate, before compaction, on a typical summer day, when the temperature is above 90 F. the mixture is in a soft, semi-liquid form. When this material has been applied to a roadway at this same temperature, after mixing and compaction, and after the evaporation of the water, the surface becomes very hard, such that, an automobile upon rapid acceleration the tires of which will not dig into the surface of the roadway but will leave skid marks. If the binding of the material was merely mechanical after compaction, when the roadway was exposed to hot weather in the summer months it would become soft. A stable paving material is formed which is much stronger than just the mechanical blending and sticking together of the aggregate particles with the emulsion.

Rosin is known as tackifier which mechanically "sticks" or mechanically adheres aggregate together. However, it was completely surprising when the instant material, after compaction, remained pliable but became bonded together to such a degree that, as mentioned, the rapid acceleration of automobile tires did not dig into the surface of the paving material. Based upon the prior art and literature it would be predictable that the addition of rosin to pitch would result only in an expensive "pitch-type" dust control agent for roadways and not the instant surprising result.

When the term "emulsifying agent" is used herein, it is meant to mean that is will facilitate the formation of an emulsion. An emulsion as defined herein or as used herein, is defined in the Condensed Chemical Dictionary 9th Edition, page 340.

Any suitable emulsifying agent may be used. Emulsifiers may be anionic, cationic or nonionic. A large number of such emulsifying agents are well known in the emulsion art. Anionic emulsifiers include soaps, such as, the alkali metal soaps of fatty acids, rosin acids, tolyl acids, alkaryl sufonic acids, and the like. Cationic emulsifying agents include aliphalic amines, aromatic amines with fatty acid chains, fatty amides quaternary ammonium salts, polyethylene diamines and their quaternary ammonium derivatives, alkyl imidazolines and the like. Nonionic emulsifying agents include polyoxyethylene derivative of alcohols, acids, ethers, phenols, amides, or amines. The nonionic emulsifiers are presently preferred because they produce a stable emulsion. By "stable" it is meant, that the emulsion will not separate out during the shelf life of the concentrated emulsion. When the word "stable" is used herein to describe the emulsion, it is meant that the concentrated emulsion contains a nonionic emulsifier which results in an emulsion which will not separate out into the pitch and rosin phase from the water phase of emulsion for at least 6 months. Further, when the final product i.e., diluted emulsion, is applied to the aggregate, cationic emulsifying agents tend to keep the emulsion completely emulsified thereby preventing the pitch and rosin phase of the emulsion from coating the aggregate. Further when the concentrated emulsion is diluted with water for ease of application purpose, the nonionic emulsifying agents are more compatible with hard water and as a result are not readily affected by pH changes in the water. A charged emulsifying agent is more sensitive to these pH changes in the water than the nonionic emulsifying agents.

The concentrated emulsion may be diluted with water for application onto aggregate material either in situ or when the aggregate material is not in situ. The concentrated emulsion has the characteristics of at least a 6 month shelf life without separation into the phases of the emulsion. The concentrated emulsion maybe dilutable with water up to a ratio of 30 parts by weight of water to one part by weight of the concentrated emulsion based on the total weight of the water and emulsion mixture. The advantage of the instant emulsion among other things is that it is environmentally safe and contains no hazardeous materials. The instant emulsion is non-flammable, noncorrosive and has a low viscosity. Further, the rosin and pitch phase of the emulsion will not plate out of the emulsion onto the surface of the roadway but will stay in the emulsion until the emulsion has penetrated into the roadway and has covered or coated the aggregate. Then when the water evaporates the rosin and pitch mixture coats the aggregate resulting in chemical bonding between aggregate particles. When this material is again exposed to water, such as, rain water, the use of the proper emulsifying agent, i.e., a nonionic emulsifying agent, will result in the rosin and pitch not being re-emulsified. This is critical to the stability of the final roadway paving product or building block and the like.

DESCRIPTION OF PREFERRED EMBODIMENTS

In accordance with one embodiment of this invention, an aggregate stabilizing mixture is disclosed which comprises pitch from about 70 to about 90 weight percent based on the total weight of the mixture and rosin from about 1 to about 30 weight percent based on the total weight of the mixture. More preferably the pitch is present in amounts from about 80 to 85 weight percent and most preferably present in amounts of about 83 weight percent based on the total weight of the mixture. Preferably, rosin is present in amounts from about 15 to about 20 weight percent and most preferably is present in amounts at about 17 weight percent based on the total weight of the mixture.

In accordance with another embodiment of the instant invention a water dilutable, non-flammable, noncorrosive, aggregate stabilizing emulsion is disclosed which comprises (a) from about 1 to about 90 weight percent based upon the total weight of said emulsion of a mixture comprising from about 5 to 95 weight percent based upon the total weight of said mixture of a pitch dispersed in said emulsion with a maximum particle size of from about 5 to 10 microns, and from about 1 to 70 weight percent based upon the total weight of said mixture of a rosin dispersed in said emulsion with a maximum particle size of from about 5 to 10 microns, (b) from about 0.1 to about 5.0 weight percent based upon the total weight of said emulsion of an emulsifying agent, and (c) from about 10.0 to 98.0 weight percent of water based upon the total weight of the emulsion of water.

In accordance with another embodiment of the instant invention, a stable, water dilutable, non-flammable, non-corrosive, dispersible, aggregate stabilizing emulsion is disclosed which comprises (a) from about 1 to about 90 weight percent based upon the total weight of the said emulsion of a mixture comprising from about 5 to 95 weight percent based upon the total weight of said mixture of a pitch dispersed in said emulsion in a maximum particle size from about 5 to about 10 microns an from 1 to about 70 weight percent based upon the total weight of said mixture of a rosin dispersed in said emulsion in a maximum particle size from about 5 to 10 microns, (b) from about 0.1 to about 5.0 weight percent based upon the total weight of said emulsion of a nonionic emulsifying agent and (c) from about 10.0 to about 98.0 weight percent based upon the total weight of the emulsion of water.

Pitch is present in the mixture in preferred amounts from about 70.0 to 90.0 weight percent and more preferably 83.0 weight percent based on a total weight of the mixture of pitch and rosin. Preferably the pitch is dispersed in the emulsion in a maximum particle size of from about 5 to about 7 microns. Rosin is present in the mixture preferably in amounts from about 1.0 to about 30.0 weight percent and more preferably from about 15 to 20 weight percent and most preferably 17.0 weight percent based upon the total weight of the mixture. Rosin is preferably dispersed in the emulsion in a maximum particle size of from about 5.0 to about 7.0 microns.

The emulsifying agent is preferably in amounts from about 1.5 to 2.5 and most preferably 2.0 weight percent based upon the total weight of the emulsion.

The above emulsions may be referred to herein as concentrated emulsions since these may be further diluted with water from about 1 to about 30 parts water to about 1 part emulsion. More preferably the dilution is from about 4 parts water to 1 part emulsion to about 20 parts water to 1 part emulsion. The preferred process of the instant invention is to pre-wet the aggregate and the mix into the aggregate the concentrated emulsion. The dilution of the emulsion with water then depends upon the ambient temperature and evaporation rate of the water already mixed with the aggregate. If it is a hot day e.g., 90° F. then more diluting with water is required in order to maintain the desired moisture in the aggregate during compaction. As mentioned, the aggregate is wetted with water so that the concentrated emulsion will penetrate and disperse more evenly and rapidly in the aggregate. The critical pre-wetting amount of water is from about 2.0 to about 3.5 weight percent of water based on the total weight of the aggregate.

In accordance with another embodiment of the invention, a process for the stabilization of aggregate is disclosed which comprises (a) first providing an emulsion comprising from about 1 to about 90 weight percent based upon the total weight of said emulsion of a mixture comprising from about 5 to about 95 weight percent based upon the total weight of said mixture of pitch dispersed in said emulsion with a maximum particle size of from about 5 to about 10 microns, from about 1 to about 70 weight percent based upon the total weight of said mixture of a rosin dispersed in said emulsion with a maximum particle size of about 5 to about 10 microns, from 0.1 to 5.0 weight percent based upon the total weight of said emulsion of an emulsifying agent, and from about 10.0 to about 98.0 weight percent based upon the total weight of said emulsion of water, (b) secondly, diluting said emulsion with from about 1 to 30 parts of water to 1 part emulsion, (c) providing an aggregate of a size which 100 weight percent based on the total weight of the aggregate passes through a sieve size from about No. 200 to about ½ inch, (d) thirdly, mixing said diluted emulsion with said aggregate sufficiently to substantially disperse all of said diluted emulsion onto substantially all of said aggregate, and (e) fourthly, compacting said aggregate with from about 50 pounds to about 50,000 pounds per sq. inch of compacting pressure resulting in said aggregate bonding together sufficiently after said water has substantially evaporated from said emulsion forming a weight supporting, water impermeable, freeze resistant, solid material. Preferably the mixture comprises from about 70.0 to about 90.0 weight percent based on the total weight of said mixture of pitch dispersed in said emulsion in a particle size from about 7 to about 10 microns. Preferably the mixture comprises from about 1.0 to about 30.0 weight percent based upon the total weight of the mixture of rosin dispersed in the emulsion in a particle size preferably from about 7 to about 10 microns. Preferably the emulsion comprises from about 1.5 to about 2.5 weight percent based on the total weight of the emulsion of the emulsifying agent. More preferably the emulsifying agent is present in the amount of 2.0 weight percent based upon the total weight of the emulsion and the emulsifying agent is preferably nonionic.

In accordance with a more preferred process for the stabilization of aggregate, this process comprises (a) first providing an emulsion comprising from about 1.0 to about 90.0 weight percent based upon the total weight of said emulsion of a mixture comprising from about 5.0 to about 95.0 weight percent based upon the total weight of said mixture of pitch dispersed in said emulsion with a maximum particle size of from about 5.0 to about 10.0 microns and from about 1.0 to about 70.0 weight percent based upon the total weight of said mixture of a rosin dispersed in said emulsion with a maximum particle size of from about 5.0 to about 10.0 microns, from about 0.1 to about 5.0 weight percent based upon the total weight of said emulsion of an emulsifying agent, and from about 10.0 to about 98.0 weight percent based upon the total weight of said emulsion of water, (b) secondly, providing an aggregate of a size which 100 weight percent based on the total weight of the aggregate passes through a sieve size from about number 200 to about one half inch, (c) thirdly mixing said aggregate with from about 2.0 to about 3.5 weight percent based upon the total weight of said aggregate of water, (d) forthly, mixing said emulsion with said prewet aggregate sufficiently to substantially disperse all of said diluted emulsion onto substantially all of said prewet aggregate, and (e) fifthly, compacting said aggregate with from about 50 pounds to about 50,000 pounds per squared inch of compacting pressure resulting in said aggregate bonding together sufficiently after said water has substantially evaporated forming a strong, weight supporting, water impermeable, freeze resistant, solid material.

Preferably the mixture comprises from about 70.0 to about 90.0 weight percent based on the total weight of said mixture of pitch dispersed in said emulsion in a particle size from about 7 to about 10 microns. Preferably the mixture comprises from about 1.0 to about 30.0 weight percent based upon the total weight of the mixture of rosin dispersed in the emulsion in a particle size preferably from about 7 to about 10 microns. Preferably the emulsion comprises from about 1.5 to about 2.5 weight percent based on the total weight of the emulsion of the emulsifying agent. More preferably the emulsifying agent is present in the amount of 2.0 weight percent based upon the total weight of the emulsion and the emulsifying agent is preferably nonionic.

In accordance with another embodiment of the invention, a strong stable, weight supporting, freeze resistant, water impermeable, repairable, material is disclosed which comprises, (a) an aggregate of a size that 100 weight percent based on the total weight of the aggregate passes through a sieve size from about number 200 to about ½ inch, said aggregate having dispersed therein a mixture comprising from about 5.0 to about 95.0 weight percent based on the total weight of the mixture of pitch and from about 1.0 to about 70.0 percent based upon the total weight of said mixture of a rosin and (b) said aggregate coated with said mixture having been compressed with from about 50 pounds to about 50,000 pounds per square inch, forming a stable, weight supporting, freeze resistant, water impermeable, repairable, solid material.

Preferably the aggregate is a size in which 100 weight percent based on the total weight the aggregate passes through a sieve from about a number 40 to about ½ inch. More preferably the mixture comprises 83.0 weight percent based on the total weight of the mixture of pitch and preferably comprises 17.0 weight percent based on the total weight of said mixture of rosin and said aggregate size is from about number 10 sieve to about one-half inch sieve.

The following examples are illustrative only and should not be construed as limiting the invention. All parts and percentages referred to herein are on a weight basis, all viscosities measured at 25° C. unless otherwise specified.

EXAMPLE 1

An aggregate stabilizing mixture of pitch and rosin (pine tar mixture) and an aggregate stabilizing emulsion is prepared as follows:

2835.6 pounds of rosin obtained from Arizona Chemical Co. under the trademark ACINTOL® R-Type S (tall oil rosin) and 13,844.4 pounds of pitch obtained from Arizona Chemical Co. under the trademark ACINTOL® P (tall oil pitch) are mixed together in a conventional type mixer. This mixture is referred to as a "pine tar" mixture herein. Standard emulsifying technology may be used to manufacture the instant emulsion. The pine tar mixture is pumped into a batch feed tank at a temperature of 225° F. The pine tar mixture temperature should be maintained above 150° F. and less than 400° F. with a preferred temperature of 225° F. maintained. 24,186 pounds of water is then pumped into an aqueous phase batch feed tank. The temperature need only be high enough to ensure complete dissolution of the emulsifying agent in the water. 120° F. is the preferred aqueous phase temperature. The water is heated to 120° F. 834 pounds of emulsifying agent obtained under the trademark REDICOTE® E-47 from AKZO Chemie America, Chicago, Illinois is also pumped into the aqueous phase batch feed tank. The water and the emulsifying agent are mixed for about 20 minutes and the temperature is maintained at 120° F.

The feed pump in the batch feed tank containing the pine tar mixture is activated. The feed pump connected to the aqueous phase batch feed tank is also activated. There is a 3-way valve connected to the batch feed tank which allows for total recirculation of the pine tar mixture back into the batch feed tank. Further there is also a 3-way valve connected to the aqueous phase batch feed tank which allows for total circulation of the water containing the emulsifying agent back to the aqueous phase batch feed tank. The 3-way valve on the aqueous phase batch feed tank is adjusted to send the aqueous phase through the emulsifier. The 3-way valve on the pine tar mixture batch feed tank is also adjusted to send the pine tar mixture through the emulsifyer. The valve on the aqueous phase batch feed tank is adjusted so as to maintain an exit temperature out of the emulsifier at a temperature of 146.25° F. The emulsifier exit valve is maintained such that there is a back pressure of 40 PSI in the emulsifier. The emulsifier head shaft is maintained at a RPM differential of 1200 RPM. The pine tar mixture in the batch feed tank and the water and emulsifying agent in the aqueous phase batch feed tank are pumped through the emulsifier. The emulsion from the emulsifier is directed to a storage tank. This process is continued until all of the pine tar mixture and aqueous phase (water containing the emulsifying agent) are emulsified. Care must be taken to insure that a final temperature of less than 212° F. is not reached inorder to avoid boiling the emulsion which will lead to the separation of phases.

Any standard emulsifying unit can be used that will produce a maximum particle size of less than 10 microns and preferably a maximum particle size in the range of 5 to 7 microns. A preferred emulsifying unit may be a Dalworth Machine Products MP-4 Emulsification Plant.

Final solids level of the concentrated emulsion may range from 0.1 percent to 99.9 percent by weight based upon the total weight of the emulsion, with the preferred solids being 40 percent by weight.

The following is an example of the procedure used to form a preferred embodiment of the instant invention comprising a paving material.

Aggregate of the size consisting of about ½ inch is typical. This aggregate is placed on the surface of the roadway. 0.25 to about 1 gallon and preferably 0.25 to 0.33 gallons of concentrated emulsion is applied per square surface yard per 1 inch deep of aggregate resulting in from about 1.0 to about 4.0 percent by weight based on the total weight of the aggregate of residual pine tar mixture in the stabilized aggregate. The emulsion may be diluted with water. The dilution ratio of the emulsion is determined by the amount of water required to saturate the aggregate with the emulsion to just above the optimum compaction moisture of the aggregate. Water preferably is applied to the aggregate in amounts of from about 2.0 to about 3.0 percent by weight of water based on the total weight of the aggregate. After the pre-wetting with water, the concentrated emulsion is applied by use of standard spraying equipment to insure thorough and even saturation of the aggregate. The pre-wetting of the aggregate before applying the concentrated or diluted emulsion is a critical element of the instant invention. The criticality is to get the critical amounts of water and critical amounts of the pine tar mixture, mixed evenly into the aggregate so that the aggregate is not overly wet. When paving roadways containing surfaces of aggregate, the aggregate must be wet with water to a degree that is just above the optimum compaction moisture level. The most efficient way to achieve this optimum compaction moisture is to first pre-wet the aggregate with water and then apply the concentrated emulsion to the aggregate. A road grading machine may be used to mix the pre-wetted aggregate with the emulsion. The surface of the roadway may then be dusted with sand or other fine material after the first application of the emulsion in order to adsorb any surface moisture and to reduce surface tackiness prior to compaction with a standard asphalt roller. This compaction is from 50 to 50,000 pounds per square inch.

After the initial application of the emulsion has dried and the water has evaporated and it has "cured", a second application of the emulsion may be applied to the surface, dusted with sand or fines and a standard 20 ton asphalt roller is used to compact the aggregate.

Preferably about 80 percent of the total amount of emulsion is mixed into the aggregate the first day and the remaining 20 percent is applied to the roadway the second day. This "aggregate", which may be rock, limestone, gravel, shale, shells, etc., may have dispersed in it from about 0.01 to 18 preferably 1.0 to about 10.0 and most preferred 2.5 to 10.0 percent by weight of the emulsion which results in from about preferably 0.4 to about 4.0 and most preferred 4.0 residual percent by weight "pine tar mixture" dispersed in the stabilized aggregate.

A multitude of technical problems were solved which resulted in the formation of this commercially acceptable product. As mentioned earlier, the pitch/rosin ratio in the pine tar mixture is critical in determining the final product performance. If sufficient amounts of rosin are not present the aggregate will not chemically adhere and if excess rosin is present, the final paving material will become brittle and will break up under heavy traffic. Further, excess amounts of rosin in the emulsion will cause crystalization in the emulsion. This lends instability to the emulsion and will greatly shorten the shelf life of the emulsion.

The emulsifying agent is very critical if certain properties are desired in the final solid product. As mentioned, a large number of emulsifying agents may be used but it is critical that a nonionic emulsifying agent be used if after spraying down the emulsion it is desired that the pine tar mixture comprising pitch and rosin not be re-emulsified on the road. The pine tar mixture after the water has evaporated must remain in that state and not be re-emulsified when contacted with water. If this happens the mixture will be washed away with water.

It is critical that the solids in pine mixture remain below 40 percent in that higher solids in the emulsion will result in phase separation and thus will shorten the shelf life of the emulsion.

The product of the instant invention may be used not only for stabilizing aggregate in the paving of roadways, but it also may be used in the maintenance and repair of roadways and also as patching and sealing material. A paved roadway using the instant invention appears to be a black top surface but actually is brown in color. The surface is hard enough that skidding tires from motor vehicles leave skid marks on the surface, the surface actually sheds water, the roadway is pliable and will not break up under maximum allowable highway axle weights and the roadway surface is resistant to freeze and thaw cycles. Further, when the material is used to fill "pot holes" and cracks as patching material, the material used will not "pop out" of the "pot holes" as found in even more expensive patching material. The instant material will become pliable and actually become sealed into the surrounding roadway surface.

The following represents a comparison of standard hot mix or cold mix asphalts to the stabilized aggregate of the instant invention.

It is know that standard hot mix or cold mix asphalts typically range from about 1000 to 2000 pounds on the Marshall Stability Test. The higher the number on the Marshall Stability Test means that the specimen is stronger and more desirable.

The percent of residual asphalt to achieve 1000 to 2000 pounds on the Marshall Stability Test is usually about 4 to 6 percent by weight residual asphalt based upon the total weight of the aggregate. In the instant invention it is surpriaing to discover that 2.5 to 5 times the strength of asphalt may be obtained using $\frac{1}{4}$ to 1/6th the amount of residue of the instant emulsion. This of course results in a tremendous economic advantage in the instant product as compared to asphalt.

The following is the preferred aggregate gradation size. This size is used in the following example:

TABLE I

| SIEVE | % PASSING |
|---|---|
| $\frac{1}{2}''$ | 100% |
| $\frac{3}{8}''$ | 99 |
| No. 4 | 82 |
| No. 10 | 55 |
| No. 40 | 20 |
| No. 100 | 5 |
| No. 200 | 3 |

TABLE II

| | MARSHALL STABILITY TEST | | |
|---|---|---|---|
| INSTANT INVENTION SPECIMEN | RESIDUAL* PITCH/ ROSIN MIXTURE | STABILITY (LBS.) | FLOW (INCHES) |
| 1 | 1% Pre-Wet Aggregate | 5192 | 0.10 |
| 2 | 1% Pre-Wet Aggregate | 5320 | 0.08 |
| 3 | 2% Pre-Wet Aggregate | 6055 | 0.09 |
| 4 | 2% Pre-Wet Aggregate | 5810 | 0.09 |
| 5 | 3% Pre-Wet Aggregate | 6486 | 0.08 |
| 6 | 3% Pre-Wet Aggregate | 6484 | 0.09 |
| 7 | 4% No Pre-Wetting | 3355 | 0.08 |
| 8 | 4% No Pre-Wetting | 2938 | 0.08 |
| 9 | 4% No Pre-Wetting | 3916 | 0.09 |

*The residual pitch/rosin mixture is percent by weight based upon the total weight of the aggregate.

The Marshall Stability Test is standard ASTM test D-1559 and is incorporated herein by reference. Further the Kneading Compaction Method is used in association with the Marshall Method in testing emulsified asphalts. This is also the test used on the instant product ASTM D-1561 and is incorporated herein by reference.

The asphalt industry when employing the Marshall Stability Test to determine whether an asphalt or an asphalt emulsion is suitable for paving, use the standard of 1000 pounds on the Marshall Stability Test to known whether the blend is acceptable to be placed on the surface of roadways.

Presently the instant invention is capable of obtaining 3500 pounds on the Marshall Stability Test at a 4 percent solids level of the pitch/rosin mixture in the emulsion. At equivalent residuals, as compared to asphalt, the instant invention is developing 3½ times the strength.

I claim:

1. A mixture for use as the dispersed phase in a stable, water dilutable, non-flammable, non-corrosive, dispersable, aggregate stabilizing emulsion consisting essentially of pine tar pitch from about 70 to about 90 weight percent based on the total weight of the mixture and rosin from about 1.0 to about 30 weight percent based on the total weight of the mixture wherein said mixture when emulsified with an emulsifying agent and water sufficiently to reduce the particle size of both the pine tar pitch and rosin to a maximum particle size of from about 5 to about 10 microns forms said aggregate stabilizing emulsion.

2. The mixture according to claim 1 wherein the pitch is from about 80.0 to about 85.0 weight percent and the rosin is from about 15.0 to about 20.0 weight percent based upon the total weight of the mixture.

3. The mixture according to claim 1 wherein the pitch is about 83.0 weight percent and the rosin is about 17.0 weight percent based upon the total weight of the mixture.

4. A stable, water dilutable, non-flammable, non-corrosive, dispersable, aggregate stabilizing emulsion consisting essentially of
   (a) from about 1 to about 90 weight percent based upon the total weight of said emulsion of a mixture comprising from about 5 to about 95 weight percent based upon the total weight of said mixture of pine tar pitch dispersed in said emulsion in a maximum particle size from about 5.0 to about 10.0 microns, and from about 1.0 to about 70.0 weight percent based upon the total weight of said mixture of a rosin dispersed in said emulsion in a maximum particle size from about 5.0 to about 10.0 microns,
   (b) from about 0.1 to about 5.0 weight percent based upon the total weight of said emulsion of a non-ionic emulsifying agent, and
   (c) from about 10.0 to about 98.0 weight percent based upon the total weight of the emulsion of water.

5. The emulsion according to claim 4 wherein said pitch is present in said mixture in amounts from about 70.0 to about 90.0 weight percent based upon the total weight of said mixture of pitch and rosin.

6. The emulsion according to claim 5 wherein said pitch is present in said mixture in an amount of about 83.0 weight percent and is dispersed in said emulsion in a maximum particle size of from about 5.0 to about 7.0 microns.

7. The emulsion according to claim 4 wherein said rosin is present in said mixture in amounts from about 1.0 to about 30.0 weight percent.

8. The emulsion according to claim 7 wherein said rosin is present in said mixture in amounts from 15.0 to about 20.0 weight percent.

9. The emulsion according to claim 8 wherein said rosin is present in said mixture in an amount of about 17.0 weight percent and dispersed in said emulsion in a maximum particle size of from about 5.0 to about 7.0 microns.

10. The emulsion according to claim 4 wherein said emulsifying agent is present in amounts from about 1.5 to about 2.5 weight percent.

11. The emulsion according to claim 10 wherein said emulsifying agent is present in an amount of about 2.0 weight percent.

12. The emulsion according to claim 4 wherein said emulsion is further diluted with from about 1.0 to about 30 parts water to about 1 part emulsion.

13. A process for the stabilization of aggregate comprising:
   (a) first providing a stable emulsion comprising from about 1.0 to about 90.0 weight percent based upon the total weight of said emulsion of a mixture comprising from about 5.0 to about 95.0 weight percent based upon the total weight of said mixture of pine tar pitch dispersed in said emulsion with a maximum particle size of from about 5.0 to about 10.0 microns and from about 1.0 to about 70.0 weight percent based upon the total weight of said mixture of a rosin dispersed in said emulsion with a maximum particle size of from about 5.0 to about 10.0 microns, from about 0.1 to about 5.0 weight percent based upon the total weight of said emulsion of a nonionic emulsifying agent, and from about 10.0 to about 98.0 weight percent based upon the total weight of said emulsion of water,
   (b) secondly, providing an aggregate of a size which 100 weight percent based on the total weight of the aggregate passes through a sieve size from about number 200 to about one half inch,
   (c) thirdly mixing said aggregate with from about 2.0 to about 3.5 weight percent based upon the total weight of said aggregate of water,
   (d) forthly, mixing said emulsion with said pre-wet aggregate sufficiently to substantially disperse all of said diluted emulsion onto substantially all of said pre-wet aggregate, and
   (e) fifthly, compacting said aggregate with from about 50 pounds to about 50,000 pounds per square inch of compacting pressure resulting in said aggregate bonding together sufficiently after said water has substantially evaporated forming a strong, weight supporting, water impermeable, freeze resistant, solid material.

14. The process according to claim 13 wherein said mixture comprises from about 70.0 to about 90.0 weight percent of said pitch dispersed in said emulsion in a particle size from about 7.0 to about 10.0 microns.

15. The process according to claim 13 wherein said mixture comprises from about 1.0 to about 30.0 weight percent of said rosin dispersed in said emulsion in a particle size from about 7.0 to about 10.0 microns.

16. The process according to claim 13 wherein said emulsion comprises from about 1.5 to about 2.5 weight percent of said emulsifying agent.

17. The process according to claim 16 wherein said emulsion comprises about 2.0 weight percent of said emulsifying agent.

18. A stable, material consisting essentially of
   (a) an "(aggregate)" of a size which 100 weight percent based upon the total weight of said aggregate passes through a sieve size from about number 200 to about one half inch, said aggregate having dispersed thereon an emulsion comprising from about 5.0 to about 95.0 weight percent based upon the total weight of said emulsion of wood pine of pitch dispersed in said emulsion in a maximum particle size from about 5.0 to about 10.0 microns, and from about 1.0 to 70.0 weight percent based upon the total weight of said emulsion of a rosin dispersed in said emulsion in a maximum particle size from about 5.0 to about 10.0 microns, and (b) said "(aggregate)" coated with said emulsion having been compressed with from about 50 pounds to about 50,000 pounds per square inch forming a stable, weight supporting, freeze resistant, water impermeable, repairable, solid material.

19. The material according to claim 18 wherein said aggregate is of a size which 100 weight percent based on the total weight of said aggregate passes through a sieve size from about number 40 to about one half inch.

20. The material according to claim 19 wherein said mixture comprises about 83.0 weight percent of said pitch.

21. The material according to claim 20 wherein said mixture comprises about 17.0 weight percent of said rosin.

22. A dispersed phase consisting essentially of pine tar pitch from about 70 to about 90 weight percent based on the total weight of the dispersed phase with a maximum particle size of from about 5 to about 10 microns and rosin from about 1.0 to about 30 weight percent based on the total weight of the dispersed phase with a maximum particle size of from about 5 to about 10 microns.

* * * * *